Figure 1:
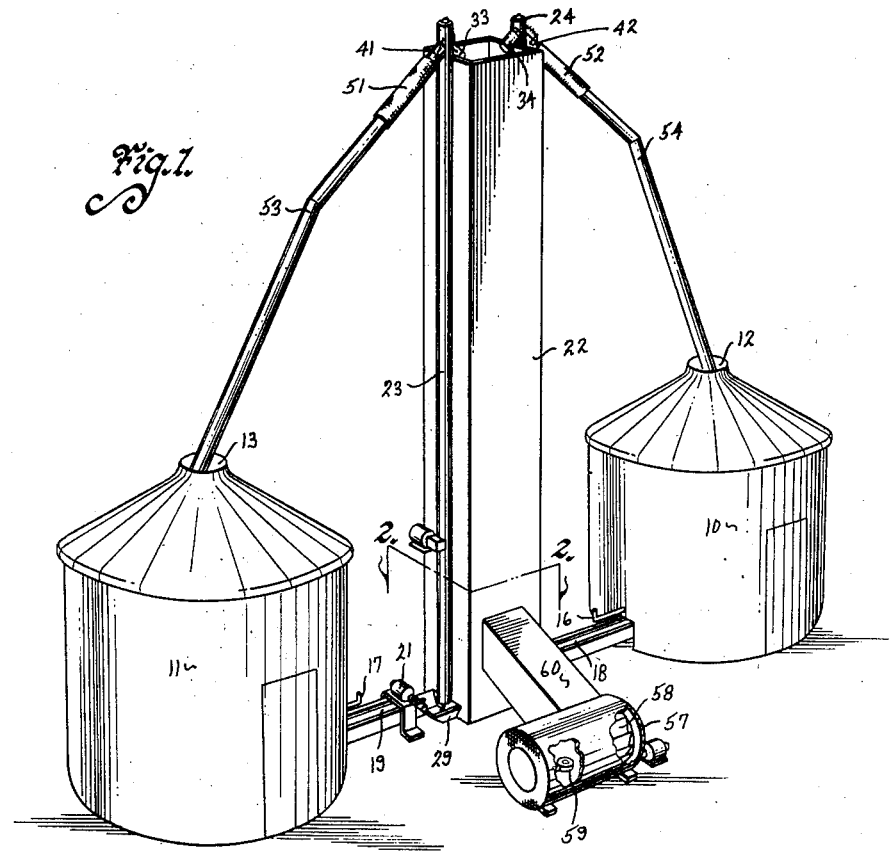

June 9, 1953  B. F. GREIMAN  2,641,063
GRAIN DRIER
Filed June 9, 1950  3 Sheets-Sheet 1

Witness
Edward P. Seely

Inventor
Benjamin F. Greiman
by M. Talbert Dick
Attorney

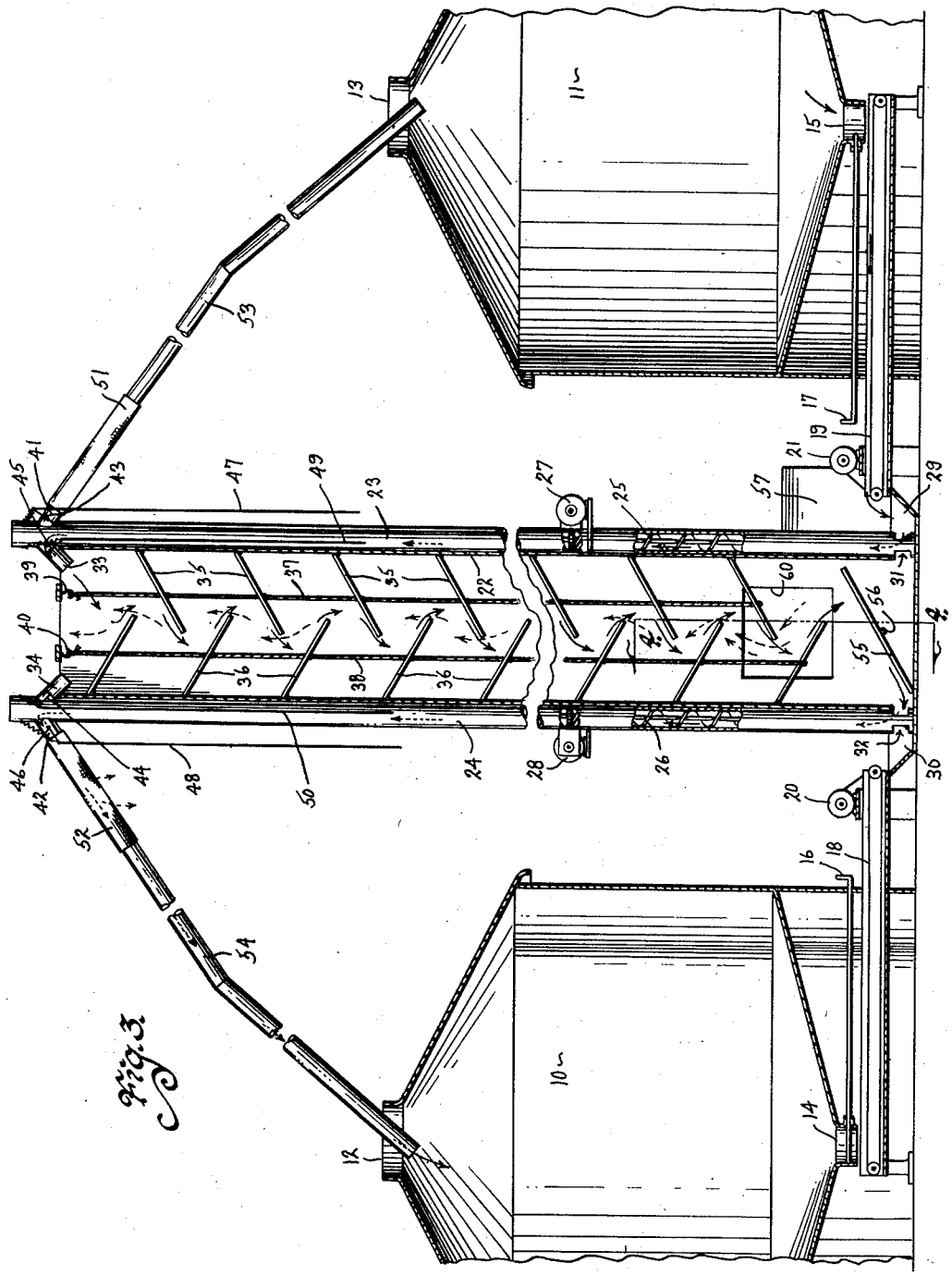

June 9, 1953  B. F. GREIMAN  2,641,063
GRAIN DRIER
Filed June 9, 1950  3 Sheets-Sheet 3
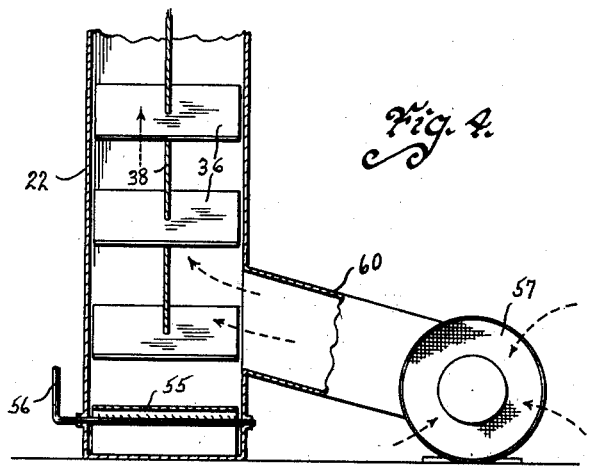
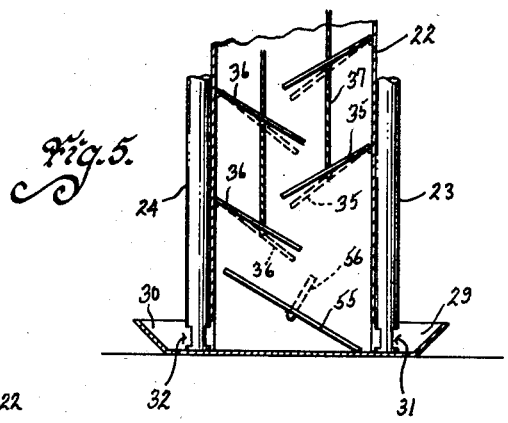
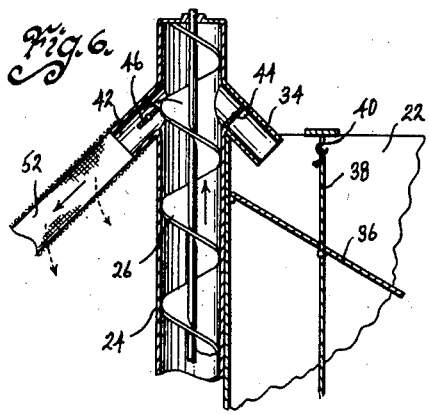
Inventor
Benjamin F. Greiman
by M. Talbert Dick
Attorney
Witness
Edward P. Seeley Patented June 9, 1953

2,641,063

UNITED STATES PATENT OFFICE 2,641,063

GRAIN DRIER

Benjamin F. Greiman, Garner, Iowa

Application June 9, 1950, Serial No. 167,079

5 Claims. (Cl. 34—102)

My invention relates to drying equipment for free flowing materials such as grain, corn and the like.

Grain drying equipment is most generally associated with grain elevator operations where most all grain dryers are now located since it is usually not practicable for individual farms to have separate dryers. There are exceptions, however, in large commercial farms, feed plants and the like but in the main the average farmer must haul his grain to elevators for drying service. Under the present day farm program of the Federal Government, for example, a good deal of corn is stored by the farmer on his own land and money is loaned thereon with various conditions as to storing and sealing. These conditions, in part, have reference to the moisture content of the corn and the corn is classified commercially downwardly as the moisture content increases. In sealing the corn for government loans, it must of course be dry and this cannot be done when the corn is harvested in the fall due to the high moisture content which would cause it to become moldy and spoil if sealed in this condition. Consequently, the newly harvested unshelled corn is usually placed in slotted cribs to await spring weather before it is shelled and dried for sealing. In these cribs the corn is subjected not only to exposure to the elements but to ravaging by mice and the like. As a result, some of the corn is ruined and experience has proven that spoilage in this way averages approximately ten percent. Obviously, a good deal of corn is taken to elevators where it is dried and stored but the capacities of elevator bins is not unlimited and when they are full no further corn can be accepted for storage. To haul the corn to these elevators merely for drying and then hauling it back to the owner's storage bin would entail unnecessary expense that is not always justified. Consequently, the only alternative at present is the method of crib storage as described.

With these problems in mind it is an object of my invention to provide a novel type grain dryer that is particularly adapted to be used independently of grain elevator installations.

More specifically, my dryer embodies the use of a drying tower having two vertical rows of spaced apart baffles respectively extending towards each other from opposite sides of the interior of the tower and arranged so that the inner end portions of the respective rows of baffles are in overlapping vertical spaced relationship whereby as the grain passes downwardly through the dryer it flows from the baffle on one row to the next lower adjacent baffle on the opposite row and so on until it reaches the bottom and is thereby subjected to more heat per foot of fall than is found in other type dryers.

A further object of this invention is to provide a grain dryer of the above class wherein the angle of slope of the baffle members are vertically adjustable.

A still further object of my invention is to provide a grain dryer as set forth above in which grain entering at the top will be dried by the time it leaves the dryer irrespective of the amount to be dried and without at any time halting the flow of grain. These and other objects will be apparent to those skilled in the art.

Figure 2:
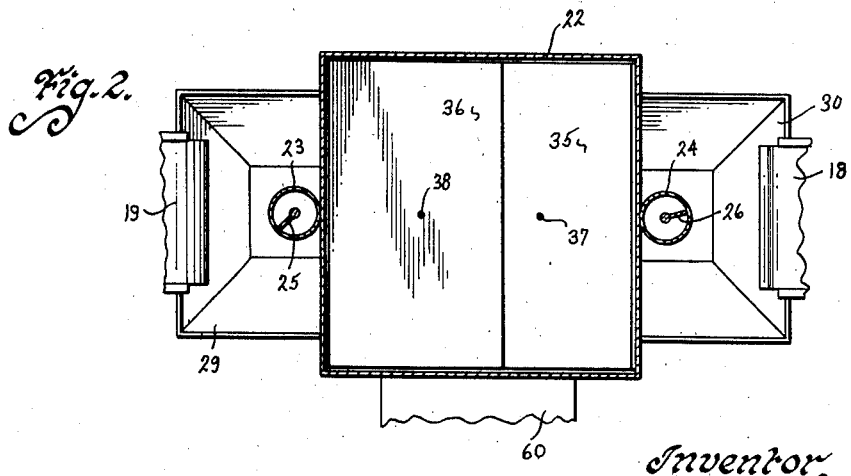

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my dryer mounted for operation and connected to two storage bins, Fig. 2 is a cross-sectional view of my dryer taken on the line 2—2 of Fig. 1, Fig. 3 is a longitudinal sectional view of this dryer showing its connection to two storage bins, Fig. 4 is a longitudinal sectional view of this device taken on the line 4—4 of Fig. 3, Fig. 5 is a cross-sectional view of the bottom portion of the drying tower, and Fig. 6 is a cross-sectional view of the top portion of one of the augers or screw lifts and showing spouts leading therefrom respectively to a storage bin and drying tower.

Referring to the drawings I have used the numerals 10 and 11 respectively to designate grain storage bins. No claim is made to these bins as such as they may be of any design. Each bin has the respective intake opening 12 and 13 at the top and the discharge outlet 14 and 15 respectively at the bottom. A valve is provided in each of the outlets to regulate the flow of grain therefrom and is manually operated by the levers 16 and 17. An endless belt, drag or the like 18 and 19, each powered by separate motors 20 and 21 respectively carry the grain, corn or the like from the bin outlets to the dryer which I will now describe.

The numeral 22 designates a vertical rectangular housing having the vertical tubular members 23 and 24 respectively secured on opposite sides of the housing on the outside thereof and extending the entire height of the housing and slightly above it as shown in Fig. 3. Mounted within each tube is the respective auger or screw lift 25 and 26 that are rotated by their separate motors 27 and 28. Integral with the bottom of the housing are the oppositely disposed hoppers 29 and 30 and also at the bottom of the housing a passageway at opposite sides thereof as at 31 and 32 communicate respectively with each auger and adjacent hopper and the interior of the housing. At the top of the housing on opposite sides the respective spouts 33 and 34 have one end extending downwardly and inwardly towards the interior of the housing and their other end communicating with the respective tubular members as shown in Figs. 3 and 6. The numerals 35 and 36 designate a plurality of baffle members respectively that are oppositely disposed within the housing and hingeably secured to the inside thereof in vertical spaced relationship. Each baffle member extends inwardly and downwardly toward the interior of the housing and the respective points where each series of baffles 35 and 36 are hinged to the housing are vertically staggered in relation to each other so that the two series extend toward each other in a staggered and overlapping arrangement as shown in Fig. 3. Through each series of baffles 35 and 36 a cable 37 and 38 respectively extends from the bottom baffle to the top of the housing where they are respectively secured to the hooks 39 and 40. Each cable is suitably secured to each individual baffle member so that movement of the cable will permit the baffles to move on their hinged end. With this arrangement the angle of slope for the baffles can be adjusted by shortening or lengthening the cables 37 and 38. On the outside of each tubular member at the top thereof and oppositely disposed to the point where the spouts 33 and 34 communicate with the interior of the housing are the exits 41 and 42 that communicate with the inside of the respective tubular members. Within each exit 41 and 42 respectively I provide a damper 43 and 44 and similarly I provide the dampers 45 and 46 for the respective spouts 33 and 34. These dampers may be controlled by any suitable means and for this purpose I show the cords 47, 48, 49 and 50 that are manually operated. Secured to the outer end of each exit 41 and 42 is a perforated sleeve or sieve 51 and 52 respectively. These sleeves each connect with the respective chutes 53 and 54 that communicate with the interior of one of the bins 10 and 11 as shown in Fig. 3. Near the bottom of the housing 22 there is the damper 55 which can be selectively moved by the hand lever 56 to direct the flow of grain from the housing to either of the passageways 31 or 32. The numeral 57 designates a heater with a suitable blower 58 and burner 59 that communicates with the interior of the housing through the passageway 60 at the bottom thereof as shown in Fig. 1. This heater may be of any type suitable for blowing warm air upwardly through the housing.

Thus constructed and arranged, this dryer will operate in the following manner. Moist grain, corn or the like to be dried can be passed through the dryer irrespective of which bin it may be in. Assuming for illustration that it is initially in bin 11, it is fed through the outlet 15 to the belt 19 which carries it to hopper 29. At the passageway 31 it is picked up by the auger 25 and carried to the top portion of the auger housing tube 23. At this point the damper 43 is closed and the damper 45 is opened so that the grain will flow through the spout 33 to the baffle 36 as indicated by the arrow in Fig. 3. The construction of the baffles 36 and 35 will cause the grain to fall downwardly in an irregular path by passing from one series of baffles to the other. By this arrangement the grain is subjected to more heat per unit of fall than in a vertical drop. At the bottom of the dryer housing 22 the damper 55 is positioned as in Fig. 3 and this deflects the grain toward passageway 32 where it is picked up by the auger 25 and carried to the top of the auger housing tube 26. Here the damper 44 is closed and the damper 46 is open to direct the flow of grain through the spout 42 to the bin 10. To move the grain from bin 10 to bin 11 through the dryer the above procedure is merely reversed with the obvious changes in the position of the several dampers. The operation as just described is generally known as a continuous run. However, at times, it may be desirable to re-run the grain through the dryer if the moisture content was so high it was not sufficiently removed the first time. This is known as batch drying and can be accomplished with my device as follows:

Assuming the grain to be in bin 11. It travels the same course as previously described up to the top of the auger housing tube 24. At this point the damper 46 is closed and the damper 44 is open so that the grain flows back into the dryer for a re-run instead of going to bin 10. If this is done, the grain as it reaches the bottom of the dryer can be directed into auger 26 for delivery to bin 10 or unto auger 25 for delivery back to bin 11.

Since the amount of grain to be dried can be any given amount, it is pointed out that if in drying any given batch, the bin will empty before the grain reaches the bottom of the dryer, it can be returned to the original storage bin. To illustrate this, assume grain in bin 11 is delivered to the dryer and bin 11 empties before the grain leaves the dryer, the damper 55 can be positioned as in Fig. 5 to return the grain to auger 25. There it can be carried to the top of the tube 23 and with the damper 33 closed and the damper 43 open it will return to bin 11. The perforated sleeves 51 and 52 permit grain to flow therethrough but will allow dust, dirt and chaff to filter out.

This invention is efficient in operation and designed to serve in places where regular grain elevator installations are not available. It can, of course, be used in connection with a commercial elevator installation if desired.

Some changes may be made in the construction and arrangement of my grain dryer without departing from the real spirit and purpose of my invention, and it is my intention to cover by my claims, any modified forms of structure or use of mechanical equivalents which may be reasonably included within their scope.

I claim:

1. In a dryer for grain or the like, a vertical housing member, two vertical rows of spaced apart baffle members respectively extending towards each other from opposite sides of the interior of said housing member and arranged so that the inner end portions of said baffle members on one row are in overlapping spaced relationship with the like portion of said baffle members on the other row, grain elevating means vertically secured to said housing member; said grain elevating means communicating with the interior of said housing member at the bottom thereof and designed to communicate at the bottom with a source of grain supply, an outlet at the top of said grain elevating means communicating with the interior of said housing member, means to selectively open and close said outlet, a second outlet at the top of said grain elevating means, a perforated sleeve member secured at one end to said second outlet and at its other end designed to communicate with a point of deposit for grain, means to selectively open and close said second outlet, means within said housing member designed to direct the flow of grain to the point of communication between said grain elevating means and the bottom of said housing member.

2. In a dryer for grain or the like, a vertical housing member, two vertical rows of spaced apart baffle members respectively extending towards each other from opposite sides of the interior of said housing member and arranged so that the inner end portions of said baffle members on one row are in overlapping spaced relationship with the like portion of said baffle members on the other row, two grain elevating devices vertically secured to two respective sides of said housing member, a first passageway from each of said devices at the bottom thereof to the interior of said housing member, a second passageway from each of said devices at the top thereof to the interior of said housing member, means to selectively open and close each of said second passageways, a third passageway from each of said devices at the top thereof designed to communicate with a point of deposit for grain, means to selectively open and close each of said third passageways, means within said housing member to selectively open and close communication between the interior of said housing member and either of said first passageways, and means for producing and forcing heated air through said housing member.

3. In a dryer for grain or the like, a vertical housing member, two vertical rows of spaced apart baffle members respectively extending towards each other from opposite sides of the interior of said housing member and arranged so that the inner end portions of said baffle members on one row are in overlapping spaced relationship with the like portion of said baffle members on the other row, two grain elevating devices vertically secured to two respective sides of said housing member, a first passageway from each of said devices at the bottom thereof to the interior of said housing member, a second passageway from each of said devices at the top thereof to the interior of said housing member, means to selectively open and close each of said second passageways, a third passageway from each of said devices at the top thereof, a perforated sleeve member communicating at one end with said third passageway and at its other end designed to communicate with a point of deposit for grain, means to selectively open and close each of said third passageways, means within said housing member to selectively open and close communication between the interior of said housing member and either of said first passageways, and means for producing and forcing heated air through said housing member.

4. In a dryer for grain or the like, a vertical housing member, two vertical rows of spaced apart baffle members respectively extending towards each other from opposite sides of the interior of said housing member and arranged so that the inner end portions of said baffle members on one row are in overlapping spaced relationship with the like portion of said baffle members on the other row, two grain elevating devices vertically secured to two respective sides of said housing member, a first passageway from each of said devices at the bottom thereof to the interior of said housing member, a second passageway from each of said devices at the top thereof to the interior of said housing member, means to selectively open and close each of said second passageways, a third passageway from each of said devices at the top thereof designed to communicate with a point of deposit for grain other than the interior of said housing member whereby grain at the top of said devices can be selectively delivered through said second passageways to the interior of said housing or through said third passageways to a point of deposit such as a storage bin or the like, means to selectively open and close each of said third passageways, means within said housing member to selectively open and close communication between the interior of said housing member and either of said first passageways, and means for producing and forcing heated air through said housing member.

5. In a dryer for grain or the like, a vertical housing member, two vertical rows of spaced apart baffle members respectively extending towards each other from opposite sides of the interior of said housing member and arranged so that the inner end portions of said baffle members on one row are in overlapping spaced relationship with the like portion of said baffle members on the other row, two grain elevating devices vertically secured to two respective sides of said housing member, each baffle member being hingedly secured to an inner side of said housing member and vertically adjustable, a first passageway from each of said devices at the bottom thereof to the interior of said housing member, a second passageway from each of said devices at the top thereof to the interior of said housing member, means to selectively open and close each of said second passageways, a third passageway from each of said devices at the top thereof designed to communicate with a point of deposit for grain, means to selectively open and close each of said third passageways, means within said housing member to selectively open and close communication between the interior of said housing member and either of said first passageways, and means for producing and forcing heated air through said housing member.

BENJAMIN F. GREIMAN.

References Cited in the file of this patent

UNITED STATES PATENTS

| Number | Name | Date |
|---|---|---|
| 51,880 | Sutton | Jan. 2, 1866 |
| 56,868 | Tonnar | July 31, 1866 |
| 716,462 | McElheny | Dec. 23, 1902 |